United States Patent
Codilian et al.

(10) Patent No.: US 7,023,640 B1
(45) Date of Patent: Apr. 4, 2006

(54) ACCELERATION DISTURBANCE DETECTION SUBSYSTEM FOR USE WITH DISK DRIVES

(75) Inventors: Raffi Codilian, Irvine, CA (US); Lan V. Ngo, Garden Grove, CA (US); Norman D. Gardner, Aliso Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/856,400

(22) Filed: May 27, 2004

(51) Int. Cl.
*G11B 19/04* (2006.01)
*G11B 21/02* (2006.01)
*G11B 19/02* (2006.01)

(52) U.S. Cl. .............................. 360/60; 360/69; 360/75
(58) Field of Classification Search ................. 360/60, 360/69, 75
See application file for complete search history.

(56) References Cited

U.S. PATENT DOCUMENTS

| | | | |
|---|---|---|---|
| 5,986,845 A | 11/1999 | Yamaguchi et al. | |
| 6,407,876 B1 | 6/2002 | Yamaguchi et al. | |
| 6,417,979 B1 * | 7/2002 | Patton et al. | 360/75 |
| 6,429,990 B1 * | 8/2002 | Serrano et al. | 360/60 |
| 6,721,122 B1 * | 4/2004 | Aikawa et al. | 360/77.02 |
| 2003/0218819 A1 * | 11/2003 | Sri-Jayantha et al. | 360/75 |

* cited by examiner

*Primary Examiner*—Andrew L. Sniezek
(74) *Attorney, Agent, or Firm*—Hogan & Hartson LLP

(57) ABSTRACT

A disk drive comprising a first sensor mounted on a nominally stationary portion of the disk drive and adapted to detect acceleration disturbances of the disk drive. The disk drive further comprising: a dual-function subsystem having a first circuit adapted to provide a write-inhibit signal and a second circuit adapted to provide a feed-forward basis signal, the dual-function subsystem adapted to receive a first sensor signal from the first sensor and to provide (a) the write-inhibit signal based on the received first sensor signal and a first threshold value, and (b) the feed-forward basis signal based on the received first sensor signal.

43 Claims, 5 Drawing Sheets

ACCELERATION DISTURBANCE DETECTION SUBSYSTEM FOR USE WITH DISK DRIVES

FIELD OF THE INVENTION

This invention relates to effects of acceleration disturbances on a disk drive. More particularly, the present invention is directed to the detection of vibration and shock forces in a disk drive.

BACKGROUND OF THE INVENTION

Disk drives are commonly used to store large amounts of data in a readily available form. Typically, the primary components of a disk drive are a head disk assembly and a printed circuit board assembly (PCBA) which, when fixed to one another, form a functional unit that is then connected to a computer. The head disk assembly includes a head, and at least one data storage disk mounted on a spindle motor for rotating the storage disk near the head so that read/write operations may be performed on the disk.

A widely used measure of performance of a disk drive is the number of I/O operations performed by the disk drive. As such, it is essential that factors that adversely interfere with such operations be removed or reduced to within acceptable limits. One such adverse factor is low level acceleration, such as linear or rotational vibration. Vibration can be induced due to a number of factors, such as when other disk drives in the same chassis spin or perform seek operations, or external forces on the rack or chassis containing the drive. Another adverse factor is high level acceleration, such as shock forces exerted on the disk drive, such as by an accidental dropping or shaking of the disk drive. When the presence of such adverse factors exceeds acceptable limits of a drive's tolerance, the head may be shaken off-track during the read/write operations, causing delays in the scheduled operations of the drive, or even destruction of existing data on adjacent tracks.

To reduce the effects of the low and high level acceleration, sensors are mounted on the disk drive, such as on the PCBA. Since the required gain and conditioning corresponding to the detection of low level acceleration is different than that of high level acceleration, dedicated sensors are commonly used for each function. The use of multiple sensors, however, increases the overall complexity and cost associated with the manufacturing of the disk drives in today's competitive market.

Accordingly, what is needed is a reduction of the cost associated with using sensors for the detection of vibration and shock forces in disk drives.

SUMMARY OF THE INVENTION

This invention can be regarded as a disk drive comprising a base, a cover, a disk being formatted with embedded servo sectors, a rotary actuator, a head affixed to the rotary actuator for reading the servo sectors and for performing write operations to the disk, a sampled servo control system for processing the detected acceleration and the servo sectors read by the head to control motion of the rotary actuator, a first sensor mounted on a nominally stationary portion of the disk drive, the sensor adapted to detect acceleration disturbances of the disk drive.

The disk drive further comprises a dual-function subsystem having a first circuit adapted to provide a write-inhibit signal and a second circuit adapted to provide a feed-forward basis signal, the dual-function subsystem adapted to receive a first sensor signal from the first sensor and to provide (a) the write-inhibit signal based on the received first sensor signal and a first threshold value, and (b) the feed-forward basis signal based on the received first sensor signal.

This invention can be also be regarded as a disk drive comprising a base, a cover, a disk being formatted with embedded servo sectors, a rotary actuator, a head affixed to the rotary actuator for reading the servo sectors and for performing write operations to the disk, a sampled servo control system for processing the detected acceleration and the servo sectors read by the head to control motion of the rotary actuator, a first sensor mounted on a nominally stationary portion of the disk drive, the sensor adapted to detect acceleration disturbances of the disk drive.

The disk drive further comprises a dual-gain subsystem having a first gain corresponding to a high acceleration disturbance of the disk drive and a second gain corresponding to a low acceleration disturbance of the disk drive, the dual-gain subsystem adapted to receive a first sensor signal from the first sensor and to determine a presence in the disk drive of at least one of (a) the high acceleration disturbance based on the received first sensor signal and the first gain, and (b) the low acceleration disturbance based on the received first sensor signal and the second gain.

DETAILED DESCRIPTION OF THE INVENTION

Figure 1A:
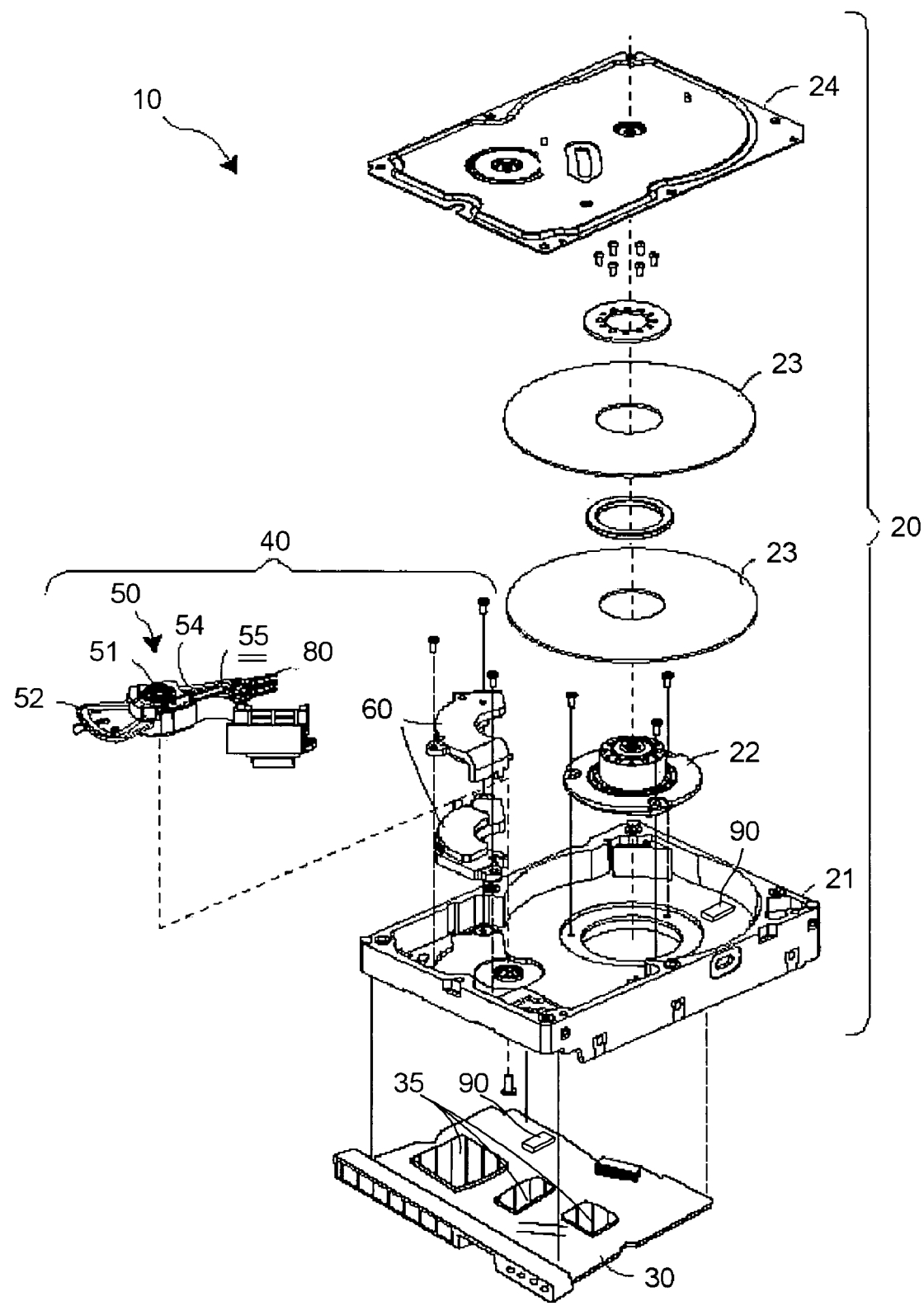
FIGS. 1A–C illustrate exemplary hard disk drives in which the present invention may be practiced.

With reference to FIG. 1A, an exemplary hard disk drive 10 in which the present invention may be practiced is shown. As shown, the disk drive 10 comprises a head disk assembly (HDA) 20 including a base 21, one or more rotating disks 23 being formatted with embedded servo sectors (not shown), a rotary actuator 50 that pivots relative to the base 21, a head 80 affixed to the rotary actuator 50 for reading the servo sectors and for performing write operations to the disks 23. The rotary actuator 50 rotates about a pivot axis extending through a center of a pivot cartridge 51 that secures the actuator 50 to the base 21, adjacent to disks 23. An actuator arm 54 extends to one side in order to carry the head 80 over a disk 23 for reading and writing data and a voice coil 52 extends from the other side for interacting with a pair of permanent magnets 60. The voice coil 52 and magnets 60 are frequently regarded as a "voice coil motor", or VCM 40. Disks 23 are rotated by a spindle motor 22. A cover plate 24 encloses the foregoing components in a cavity within the base 21.

Figure 1B:
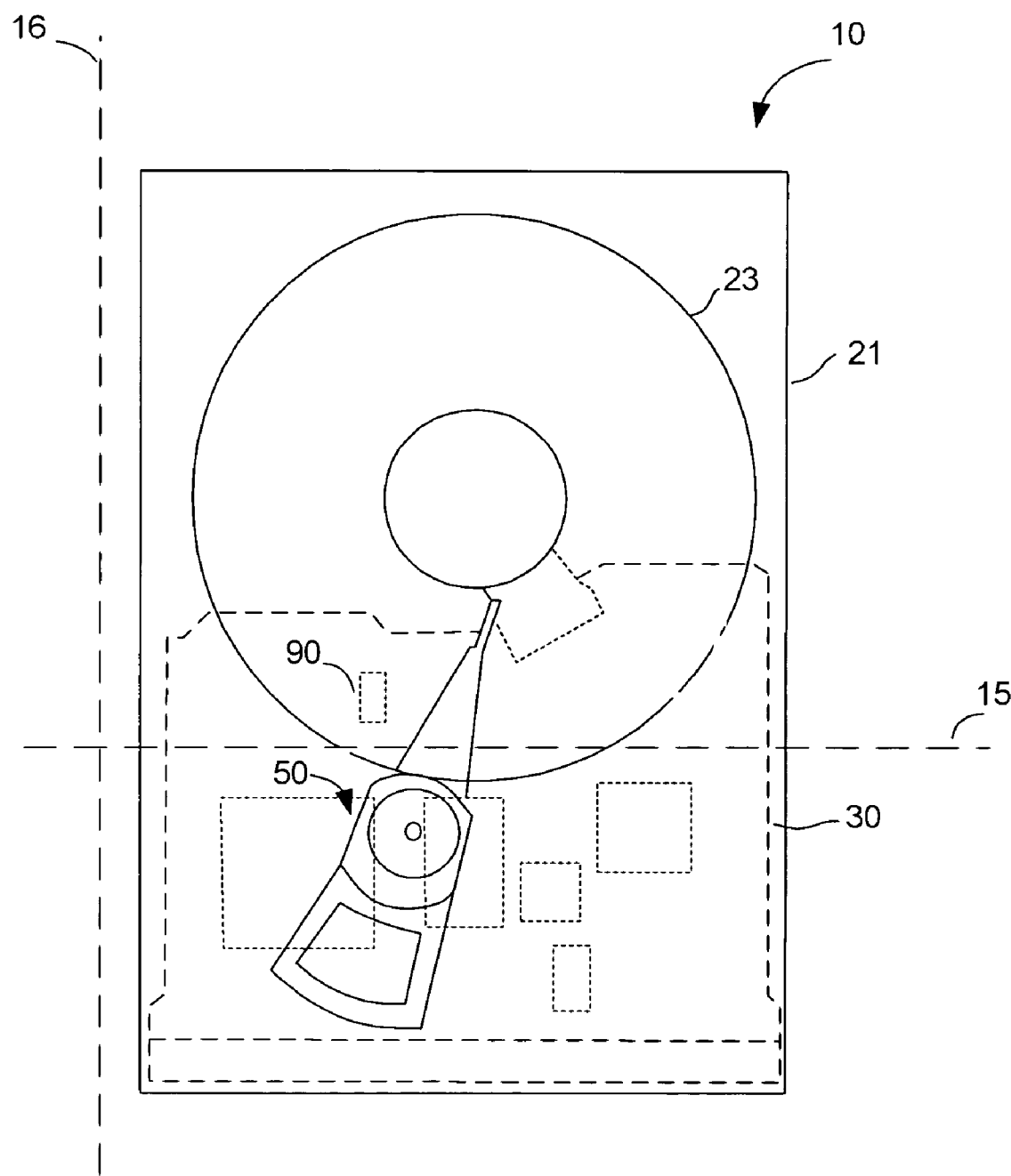

As also shown in FIG. 1A, the disk drive 10 includes a sensor 90 for detecting acceleration disturbances of the disk drive 10. Suitably, sensor 90 is mounted on a nominally stationary portion of the disk drive 10, such as on the base 21 or on the Printed Circuit Board Assembly (PCBA) 30 rigidly mounted to an underside of the base 21. The PCBA 30 also suitably contains a sampled servo control system 35 for processing the detected acceleration and the servo sectors read by the head 80, and for controlling motion of the rotary actuator 50. FIG. 1B is a simplified plan view of the disk drive 10 showing the nominally stationary PCBA 30 (in phantom) with sensor 90 mounted thereon.

Figure 2A:
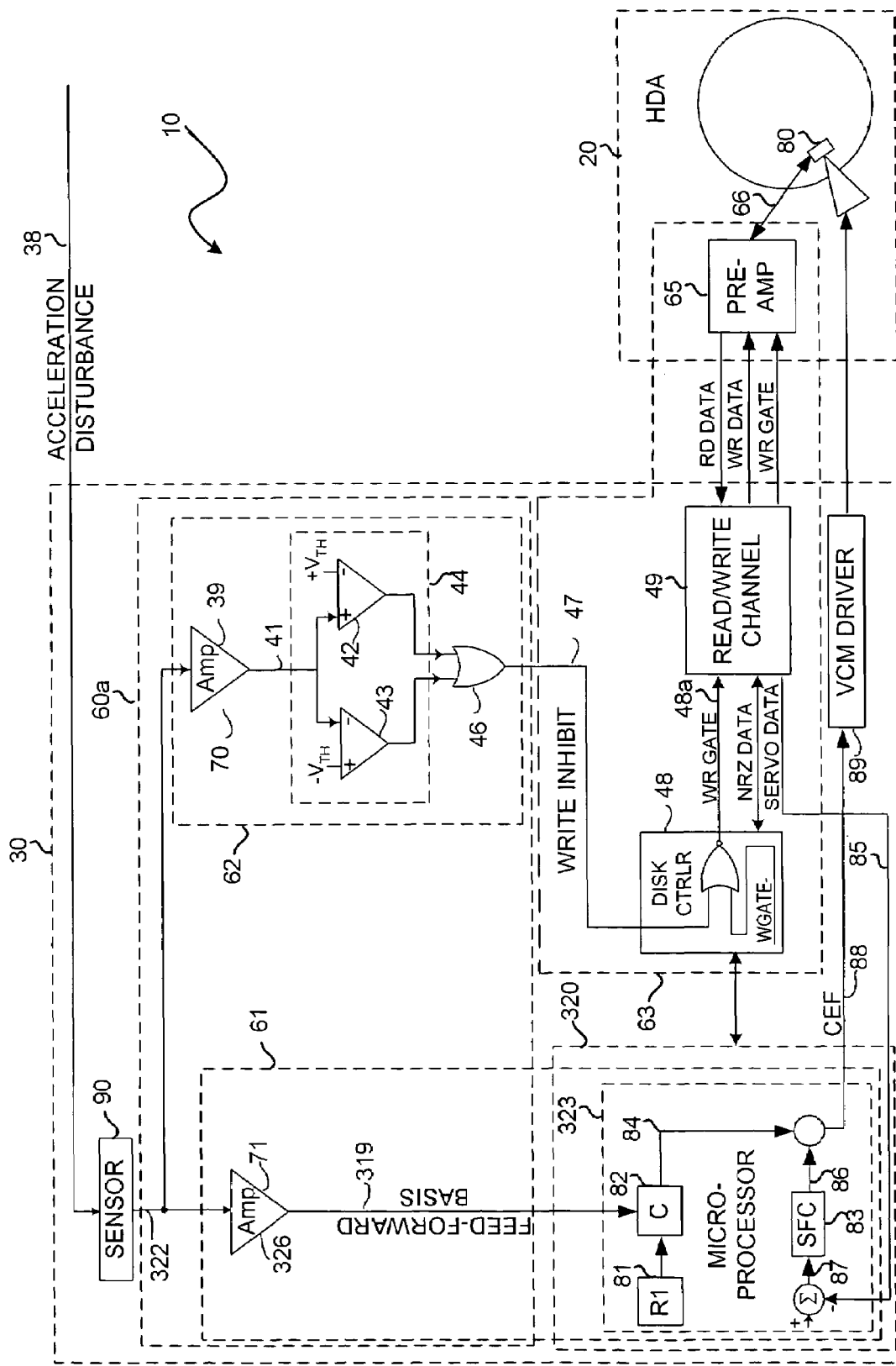
FIGS. 2A–B are block diagrams of the exemplary hard disk drives shown in FIGS. 1B and 1C respectively, including sampled servo control system disposed on the Printed Circuit Board Assembly (PCBA.

FIG. 2A is a block diagram of the exemplary hard disk drive 10 shown in FIGS. 1A–B. In one aspect, the disk drive 10 of the present invention comprises a dual-function subsystem 60a comprising a circuit 62 adapted to provide a write-inhibit signal 47 based on the sensor signal 322 received from the sensor 90 and a first threshold value. The first threshold value corresponds to an acceleration disturbance 38 generated by a shock force exerted on the disk drive 10. In an exemplary embodiment, the first threshold value corresponds to a range of 6 to 8 Gs. In another exemplary embodiment, the first threshold value corresponds to a range of 8 to 10 Gs. As shown in FIG. 2A, the dual-function subsystem 60a is in communication with a write gate control subsystem 63 comprising a disk controller 48, a read/write channel 49 comprising a write gate output 48a, and a preamplifier 65 for providing write current signals 66 to the head 80. The dual-function subsystem 60a is adapted to provide a write inhibit signal 47 to the write gate control subsystem 63 to stop an initiated write operation by the head 80.

As also shown in FIG. 2A, the dual-function subsystem 60a further comprises a circuit 61 adapted to provide a feed-forward basis signal 319 to the servo-controller 320 based on the received sensor signal 322. The circuit 61 is further adapted to provide a feed forward signal 84 to the servo control system 320 based on the feed forward basis signal 319 and a second threshold value. The second threshold value corresponds to an acceleration disturbance 38 generated by a vibration exerted on the disk drive 10. Suitably, the second threshold value is obtained from a characterization testing of a plurality of disk drives. In an exemplary embodiment, the sensor 90 comprises a linear sensor, such as a linear accelerometer wherein the second threshold value corresponds to a range of 0 to 1 G. or 1 to 3 Gs. In another exemplary embodiment, the sensor 90 comprises a rotary sensor, such as rotational accelerometer wherein the second threshold value corresponds to a range of 0 to 5 rad/sec$^2$ or 5 to 15 rad/sec$^2$.

Suitably, a microprocessor 323 is used to compare the received feed-forward basis signal 319 with the second threshold (suitably stored in a register 81) such as via a comparator subsystem 82, which then generates a feed-forward signal 84 based on predetermined procedures well known in the art (such as described in U.S. Pat. No. 6,710,966 entitled "Method for reducing an effect of vibration on a disk drive during a track following operation by adjusting an adaptive-filter gain applied to an acceleration sensor signal" herein incorporated by reference) for reducing the effect of vibration-related disturbances in the disk drive 10. Suitably, the feed-forward signal 84 is combined with a signal 86 to generate a command effort signal (CEF) 88 transmitted to the VCM Driver 89. Suitably, the signal 86 is received from the servo-feedback comparator (SFC) subsystem 83 which generated the signal 86 based on a signal 87 which is in turn based on the servo data signal 85 received from the read/write channel 49.

In another aspect, the disk drive 10 of the present invention shown in FIG. 2A comprises a dual-gain subsystem 60a comprising a circuit 62 having a gain 70 corresponding to a high acceleration disturbance of the disk drive 10, and a circuit 61 having a gain 71 corresponding to a low acceleration disturbance of the disk drive 10. The dual-gain subsystem 60a is adapted to receive a sensor signal 322 from the sensor 90 and to determine a presence in the disk drive 10 of (a) the high acceleration disturbance based on the received sensor signal 322 and the gain 70, or (b) the low acceleration disturbance based on the received sensor signal 322 and the gain 71. Suitably, a ratio of the gain 71 to the gain 70 is 5 to 1, such as a gain 71 of 8000 to a gain 70 of 1600. Suitably, gain 71 is obtained from a characterization testing of a plurality of disk drives.

As shown in FIG. 2A, the amplifier 39 having the gain 70 is adapted to receive sensor signal 322 from sensor 90. Suitably, the gain 70 comprises a gain value corresponding to a high acceleration disturbance corresponding to a shock force exerted on the disk drive 10, suitably of a magnitude greater than 6.5 Gs. The amplified signal 41 is then inputted into the absolute limit comparator subsystem 44, wherein it is received by both the limit comparators 43 and 42, and compared to their respective comparison values of −Vth and +Vth. The outputs of limit comparators 43 and 42 are inputted into the OR-gate 46 based on which a write inhibit signal 47 is generated if the presence of a high acceleration disturbance corresponding to a shock force exerted on the disk drive 10 is determined by the above comparisons. The write inhibit signal 47 is then inputted into the write gate control subsystem 63 in communication with the dual-gain subsystem 60a and comprising a disk controller 48, a read/write channel 49 comprising a write gate output 48a, and a preamplifier 65 for providing write current signals 66 to the head 80. The write gate control subsystem 63, upon receipt of the write inhibit signal 47, stops a write operation initiated by the head 80.

As shown in FIG. 2A, the dual-gain subsystem 60a also comprises a gain 71 corresponding to a low acceleration disturbance, suitably of a magnitude less than 5 Gs, corresponding to a vibration exerted on the disk drive 10. The dual-gain subsystem 60a is adapted to determine the low acceleration disturbance based on the sensor signal 322 received in the amplifier 326 having the gain 71. A feed-forward basis signal 319 is then outputted by the amplifier 326 into the servo-system 320 which (as described above) then outputs command effort signals 88 to reduce the effect of vibration-related disturbances in the disk drive 10.

One advantage of the present invention over the prior art is that by utilizing an output signal of a single sensor to sense acceleration corresponding to both vibration and shock in the disk drive 10, the cost associated with using sensors for the detection of vibration and shock forces in disk drives is reduced.

Figure 1C:
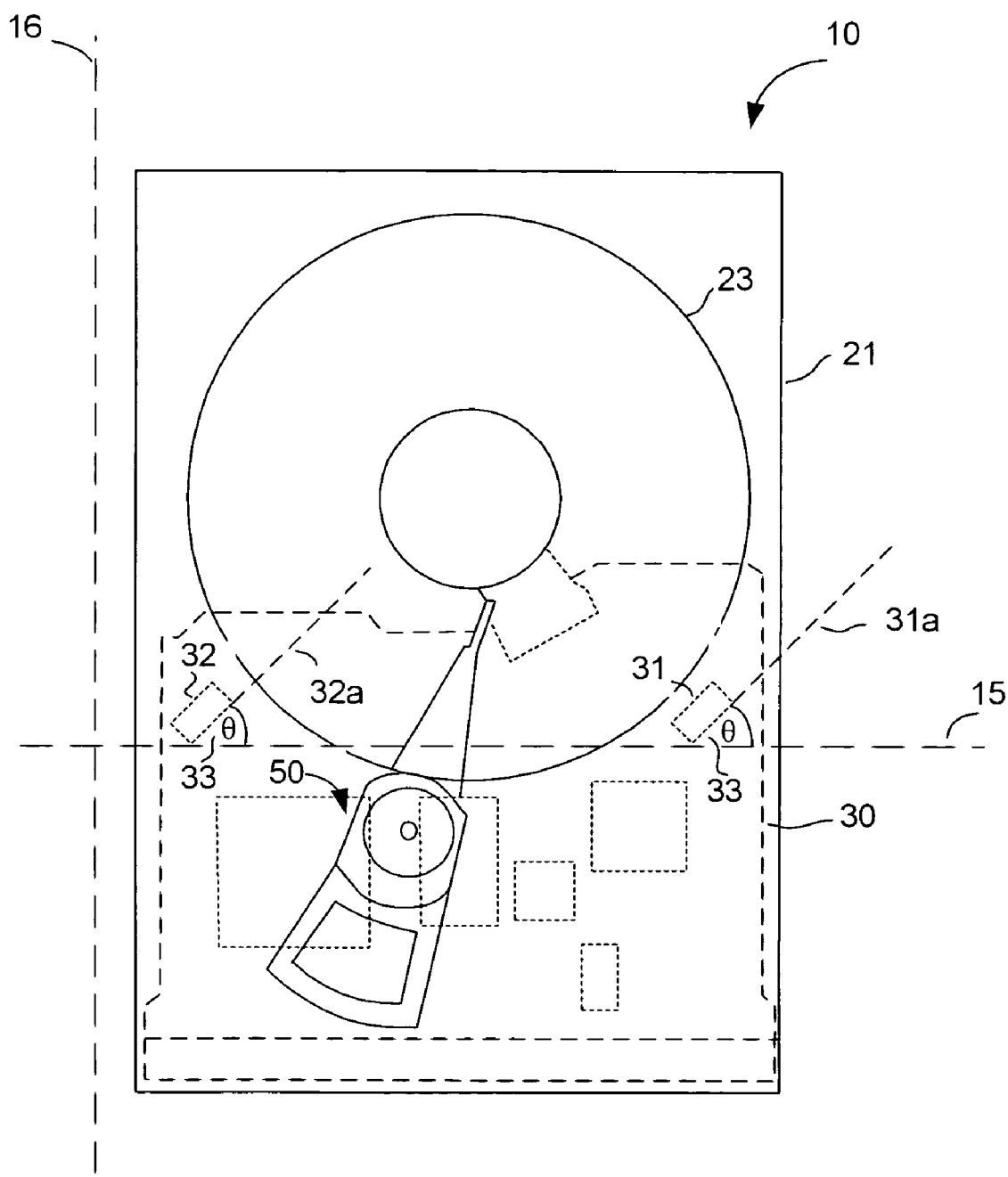

FIG. 1C is a simplified plan view of another embodiment of the present invention showing linear sensors 31 and 32 mounted on a nominally stationary portion of the disk drive 10, such as on the PCBA 30 (shown in phantom) or on the base 21 (not shown). As shown in FIG. 1C, each of sensors 31 and 32 has a sensitivity axis (represented by lines 31a and 32a, respectively) oriented at a pre-selected angle relative to an orthogonal axis 15 or 16 of the disk drive 10, such as at a pre-selected angle θ 33 (for example 45 degrees) to axis 15. Orthogonal axes 15 and 16 respectively generally correspond to x-axis and y-axis in a Cartesian coordinate system. Suitably, each of the linear sensors 31 and 32 comprises a linear accelerometer.

Figure 2B:
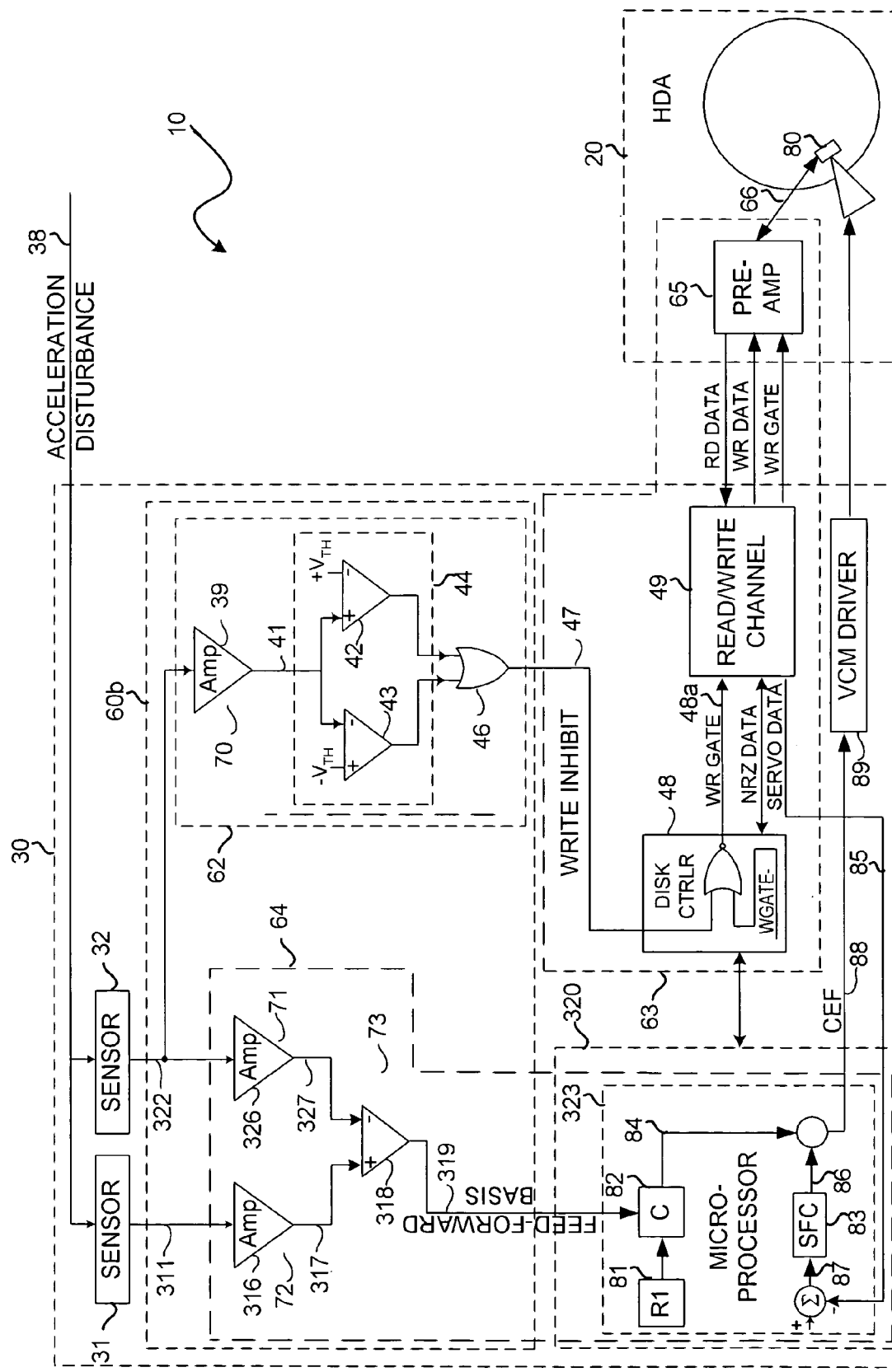

FIG. 2B is a block diagram of an exemplary hard disk drive 10 shown in FIG. 1C. In one aspect, the disk drive 10 of this embodiment of the present invention comprises a dual-function subsystem 60b comprising a circuit 62 adapted to provide a write-inhibit signal 47 based on the sensor signal 322 received from the linear sensor 32 and a first threshold value, as described above in conjunction with FIG. 2A. As also shown in FIG. 2B, the dual-function subsystem 60b further comprises a circuit 64 adapted to sense a presence of rotational vibration in the disk drive 10 based on the sensor signals 311 and 322 received from linear sensors 31, 32 respectively. The circuit 64 is further adapted to provide a feed-forward basis signal 319 to the servo-controller 320 based on the received sensor signal 322.

Suitably, the feed forward basis signal 319 comprises an algebraic sum of the sensor signals 311 and 322. The circuit 64 is further adapted to provide a feed forward signal 84 to the servo control system 320 based on the feed forward basis signal 319 and a second threshold value. The second threshold value corresponds to an acceleration disturbance 38 generated by a vibration exerted on the disk drive 10. In an exemplary embodiment, the second threshold value corresponds to a range of 0 to 5 rad/sec$^2$. In another exemplary embodiment, the second threshold value corresponds to a range of 5 to 15 rad/sec$^2$. The servo-controller 320 then (in the manner described above) outputs command effort signals 88 to reduce the effect of vibration-related disturbances in the disk drive 10.

In another aspect of the embodiment of present invention shown in FIG. 2B, the disk drive 10 comprises a dual-gain subsystem 60b comprising a circuit 62 having a gain 70 corresponding to a high acceleration disturbance of the disk drive 10, and a circuit 64 having a gain 73 (corresponding to gains 71 and 72) corresponding to a low acceleration disturbance of the disk drive 10. Suitably, gain 73 corresponds to an algebraic sum of the sensor signals 311 and 322. The dual-gain subsystem 60b is adapted to receive a sensor signal 322 from the linear sensor 32 and to determine a presence in the disk drive 10 of (a) the high acceleration disturbance based on the received sensor signal 322 and the gain 70 as described above in conjunction with FIG. 2A, or (b) the low acceleration disturbance based on the received sensor signal 322 and the gain 73, wherein the gain 73 corresponds to a presence of rotational vibration in the disk drive 10, such as having been selected in accordance with an expected range of rotational vibration. Suitably, a ratio of the gain 73 to the gain 70 is 5 to 1, such as a gain 73 of 8000 to a gain 70 of 1600. Suitably, gain 73 is obtained from a characterization testing of a plurality of disk drives.

As shown in FIG. 2B, the amplifiers 316 and 326 having gains 71 and 72, respectively receive sensor signal 322 and 311 from sensors 32 and 31, respectively, and generate amplified signals 327 and 317, respectively. The amplified signals 327 and 317 are then inputted into the differentiator subsystem 318 which outputs a feed-forward basis signal 319 to the servo-controller 320 which (as described above) then outputs command effort signals 88 based to reduce the effect of vibration-related disturbances in the disk drive 10.

It should be noted that the various features of the foregoing embodiments were discussed separately for clarity of description only and they can be incorporated in whole or in part into a single embodiment of the invention having all or some of these features.

What is claimed is:

1. A disk drive comprising a base, a cover, a disk being formatted with embedded servo sectors, a rotary actuator, a head affixed to the rotary actuator for reading the servo sectors and for performing write operations to the disk, a sampled servo control system for processing the servo sectors read by the head to control motion of the rotary actuator, and a first sensor mounted on a nominally stationary portion of the disk drive, the first sensor adapted to detect acceleration disturbances of the disk drive, the disk drive further comprising:
a dual-function subsystem having a first circuit adapted to provide a write-inhibit signal and a second circuit adapted to provide a feed-forward basis signal, the dual-function subsystem adapted to receive a first sensor signal from the first sensor and to provide (a) the write-inhibit signal based on the received first sensor signal and a first threshold value, and (b) the feed forward basis signal based on the received first sensor signal, wherein the first threshold value corresponds to a range of 6 to 10 Gs.

2. The disk drive of claim 1, wherein the servo control system is further adapted to provide a feed forward signal for controlling the rotary actuator based on the feed forward basis signal and a second threshold value.

3. The disk drive of claim 2, wherein the second threshold value corresponds to an acceleration disturbance generated by a vibration exerted on the disk drive.

4. The disk drive of claim 2, wherein the second threshold value is obtained from a characterization testing of a plurality of disk drives.

5. The disk drive of claim 2, wherein the first sensor comprises a rotary accelerometer.

6. The disk drive of claim 5, wherein the second threshold value corresponds to a range of 0 to 5 rad/sec$^2$.

7. The disk drive of claim 5, wherein the second threshold value corresponds to a range of 5 to 15 rad/sec$^2$.

8. The disk drive of claim 2, wherein the first sensor comprises a first linear accelerometer.

9. The disk drive of claim 8, wherein the second threshold value corresponds to a range of 0 to 1 Gs.

10. The disk drive of claim 8, wherein the second threshold value corresponds to a range of 1 to 3 Gs.

11. The disk drive of claim 2, wherein the disk drive further comprises a second linear sensor mounted on the nominally stationary portion of the disk drive for detecting rotational acceleration of the disk drive.

12. The disk drive of claim 11, wherein the dual-function subsystem is further adapted to receive a second sensor signal from the second linear sensor and to provide the feed forward basis signal based on the received first and second sensor signals.

13. The disk drive of claim 12 wherein the feed forward basis signal comprises an algebraic sum of the first and second sensor signals.

14. The disk drive of claim 12, wherein the second threshold value corresponds to a range of 0 to 5 rad/sec$^2$.

15. The disk drive of claim 12, wherein the second threshold value corresponds to a range of 5 to 15 rad/sec$^2$.

16. The disk drive of claim 12, wherein the disk drive further comprises a printed circuit board assembly (PCBA) and wherein the second linear sensor is mounted on at least one of the PCBA and the base.

17. The disk drive of claim 1, wherein the dual-function subsystem is in communication with a write gate control subsystem comprising a disk controller, a read/write channel comprising a write gate, and a preamplifier for providing write current signals to the head, the dual-function subsystem is further adapted to provide the write inhibit signal to the write gate control subsystem to stop an initiated write operation.

18. The disk drive of claim 1, wherein the first threshold value corresponds to an acceleration disturbance generated by a shock force exerted on the disk drive.

19. The disk drive of claim 1, wherein the disk drive further comprises a printed circuit board assembly (PCBA) and wherein the first sensor is mounted on at least one of the PCBA and the base.

20. A disk drive comprising a base, a cover, a disk being formatted with embedded servo sectors, a rotary actuator, a head affixed to the rotary actuator for reading the servo sectors and for performing write operations to the disk, a sampled servo control system for processing the servo sectors read by the head to control motion of the rotary actuator, a first sensor mounted on a nominally stationary portion of the disk drive, the sensor adapted to detect acceleration disturbances of the disk drive, the disk drive further comprising:

a dual-gain subsystem having a first gain corresponding to a high acceleration disturbance of the disk drive and a second gain corresponding to a low acceleration disturbance of the disk drive, the dual-gain subsystem adapted to receive a first sensor signal from the first sensor and to indicate a presence in the disk drive of at least one of (a) the high acceleration disturbance based on the received first sensor signal and the first gain, and (b) the low acceleration disturbance based on the received first sensor signal and the second gain, wherein the first gain comprises a first gain value corresponding to a high acceleration disturbance of a magnitude greater than 6.5 Gs.

21. The disk drive of claim 20, wherein the dual-gain subsystem is in communication with a write gate control subsystem comprising a disk controller, a read/write channel comprising a write gate, and a preamplifier for providing write current signals to the head, the dual-gain subsystem is further adapted to provide a write inhibit signal to the write gate control subsystem to stop an initiated write operation.

22. The method of claim 21, wherein a ratio of the second gain to the first gain is 5 to 1.

23. The disk drive of claim 20, wherein the high acceleration disturbance corresponds to a shock force exerted on the disk drive.

24. The disk drive of claim 20, wherein the second gain comprises a second gain value corresponding to a low acceleration disturbance of a magnitude less than 5 Gs.

25. The disk drive of claim 24, wherein the low acceleration disturbance corresponds to a vibration exerted on the disk drive.

26. The disk drive of claim 20, wherein the first sensor signal is generated by the first sensor in response to a sensed vibration of the disk drive.

27. The disk drive of claim 20, wherein the second gain value is obtained from a characterization testing of a plurality of disk drives.

28. The disk drive of claim 20, wherein the first sensor comprises a rotary accelerometer.

29. The disk drive of claim 20, wherein the first sensor comprises a first linear sensor.

30. The disk drive of claim 29, wherein the first linear sensor comprises a first linear accelerometer.

31. The disk drive of claim 20, wherein the disk drive further comprises a printed circuit board assembly (PCBA) and wherein the first sensor is mounted on the PCBA.

32. The disk drive of claim 20, wherein the first sensor is mounted on the base.

33. The disk drive of claim 29, wherein the disk drive further comprises a second linear sensor mounted for detecting rotary acceleration of the disk drive.

34. The disk drive of claim 33, wherein the dual-gain subsystem is further adapted to receive a second sensor signal from the second linear sensor and to determine a presence of rotational vibration in the disk drive based on the received first and second sensor signals and the second gain.

35. The disk drive of claim 34 wherein the second gain corresponds to an algebraic sum of the first and second sensor signals.

36. The disk drive of claim 35, wherein the dual-gain subsystem is in communication with the servo control system and further adapted to provide a feed-forward basis signal to the servo control system.

37. The disk drive of claim 33, wherein the second linear sensor comprises a second linear accelerometer.

38. The disk drive of claim 33, wherein the disk drive further comprises a printed circuit board assembly (PCBA) and wherein the second linear sensor is mounted on the PCBA.

39. The disk drive of claim 33, wherein the second sensor is mounted on the base.

40. A disk drive comprising a base, a cover, a disk being formatted with embedded servo sectors, a rotary actuator, a head affixed to the rotary actuator for reading the servo sectors and for performing write operations to the disk, a sampled servo control system for processing the servo sectors read by the head to control motion of the rotary actuator, and a first sensor mounted on a nominally stationary portion of the disk drive, the first sensor adapted to detect acceleration disturbances of the disk drive, the disk drive further comprising:

a dual-function subsystem having a first circuit adapted to provide a write-inhibit signal and a second circuit adapted to provide a feed-forward basis signal, the dual-function subsystem adapted to receive a first sensor signal from the first sensor and to provide (a) the write-inhibit signal based on the received first sensor signal and a first threshold value, and (b) the feed forward basis signal based on the received first sensor signal, wherein the servo control system is further adapted to provide a feed forward signal for controlling the rotary actuator based on the feed forward basis signal and a second threshold value, wherein the first sensor comprises a rotary accelerometer, and wherein the second threshold value corresponds to a range of 0 to 15 rad/sec$^2$.

41. The disk drive of claim 40, wherein the disk drive further comprises a second linear sensor mounted on the nominally stationary portion of the disk drive for detecting rotational acceleration of the disk drive and wherein the dual-function subsystem is further adapted to receive a second sensor signal from the second linear sensor and to provide the feed forward basis signal based on the received first and second sensor signals.

42. A disk drive comprising a base, a cover, a disk being formatted with embedded servo sectors, a rotary actuator, a head affixed to the rotary actuator for reading the servo sectors and for performing write operations to the disk, a sampled servo control system for processing the servo sectors read by the head to control motion of the rotary actuator, and a first sensor mounted on a nominally stationary portion of the disk drive, the first sensor adapted to detect acceleration disturbances of the disk drive, the disk drive further comprising:

a dual-function subsystem having a first circuit adapted to provide a write-inhibit signal and a second circuit adapted to provide a feed-forward basis signal, the dual-function subsystem adapted to receive a first sensor signal from the first sensor and to provide (a) the write-inhibit signal based on the received first sensor signal and a first threshold value, and (b) the feed forward basis signal based on the received first sensor signal, wherein the servo control system is further adapted to provide a feed forward signal for controlling the rotary actuator based on the feed forward basis signal and a second threshold value, wherein the first sensor comprises a linear accelerometer, and wherein the second threshold value corresponds to a range of 0 to 3 Gs.

43. A disk drive comprising a base, a cover, a disk being formatted with embedded servo sectors, a rotary actuator, a head affixed to the rotary actuator for reading the servo sectors and for performing write operations to the disk, a sampled servo control system for processing the servo sectors read by the head to control motion of the rotary actuator, a first sensor mounted on a nominally stationary portion of the disk drive, the sensor adapted to detect acceleration disturbances of the disk drive, the disk drive further comprising:

a dual-gain subsystem having a first gain corresponding to a high acceleration disturbance of the disk drive and a second gain corresponding to a low acceleration disturbance of the disk drive, the dual-gain subsystem adapted to receive a first sensor signal from the first sensor and to indicate a presence in the disk drive of at least one of (a) the high acceleration disturbance based on the received first sensor signal and the first gain, and (b) the low acceleration disturbance based on the received first sensor signal and the second gain, wherein the second gain comprises a second gain value corresponding to a low acceleration disturbance of a magnitude less than 5 Gs.

* * * * *